March 26, 1935.   R. L. DASHNER   1,995,671
SWITCH
Filed May 11, 1933   2 Sheets-Sheet 1

Inventor:
Ralph L. Dashner
By Brown, Jackson, Boettcher
& Dienner Attys.

March 26, 1935.  R. L. DASHNER  1,995,671
SWITCH
Filed May 11, 1933   2 Sheets-Sheet 2
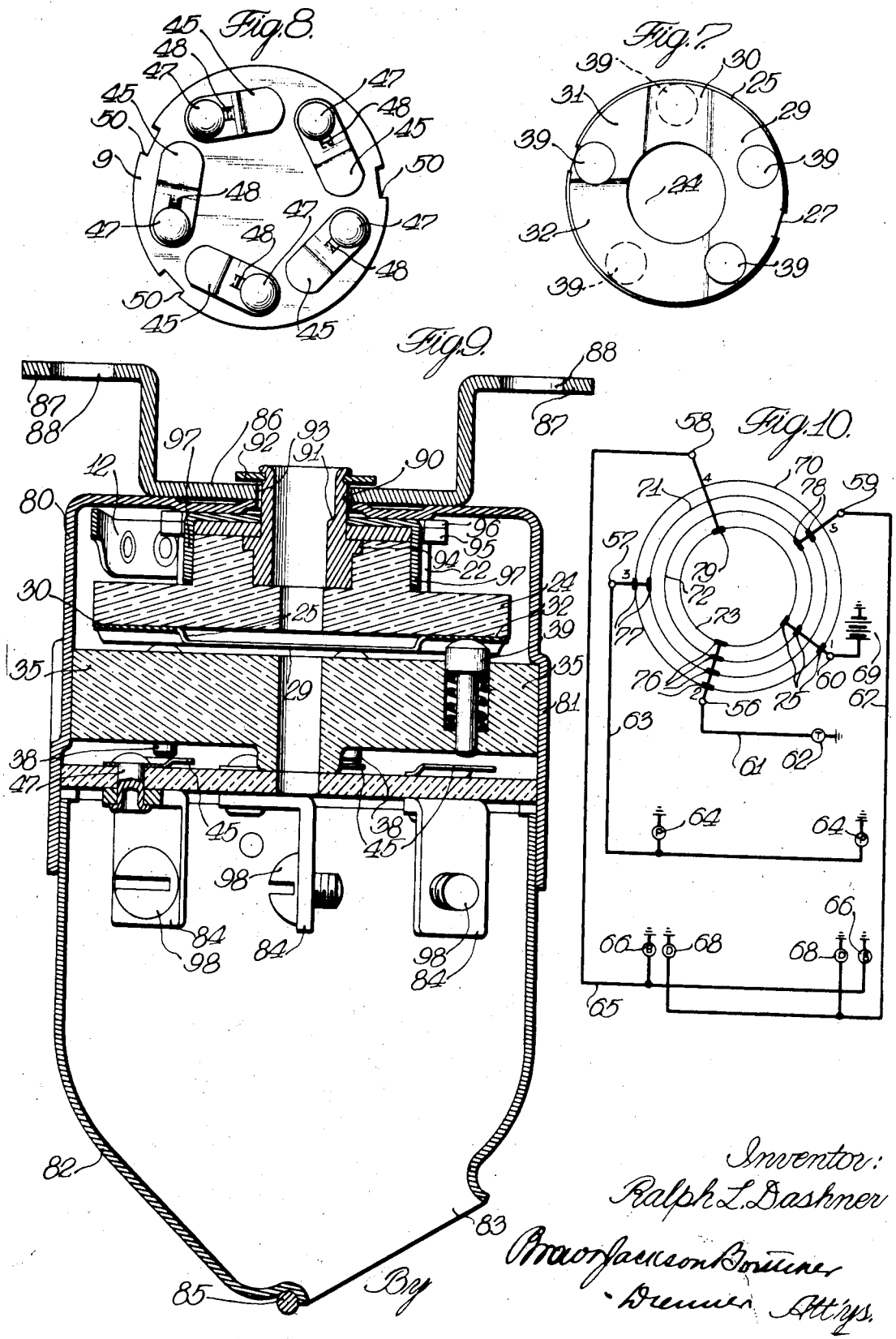

Patented Mar. 26, 1935

1,995,671

UNITED STATES PATENT OFFICE 1,995,671

SWITCH

Ralph L. Dashner, Logansport, Ind., assignor to R-B-M Manufacturing Co., Logansport, Ind., a corporation of Indiana Application May 11, 1933, Serial No. 670,400

31 Claims. (Cl. 200—16)

This invention relates to switches and more particularly to switches for lighting systems in automotive vehicles and the like.

In its preferred embodiment, the present invention is directed to a switch of this type which is of small external diameter, and which may be carried within a bushing disposed in the steering column of an automobile or other type of vehicle. In switches of this type, the switch operating lever is usually mounted adjacent the hub of the steering wheel of the vehicle, convenient for manual operation by the driver. However, the switch mechanism is ordinarily disposed at the base of the steering column, and has conductors leading therefrom to the head lamps, parking lights, and the tail light of the vehicle.

It is an object of the present invention to provide a switch of this type which may be disposed within the steering column, where it is removed from danger of accidental mechanical injuries, shorting, or the like, and is fully protected by the steering column housing.

It is also within the scope of the invention to dispose the present type of switch in position upon the instrument board of the vehicle, since, because of its compactness and the small space necessary for its mounting, it can be readily mounted in such position and operated by a control lever extending outwardly from the surface of the board.

Another object of the present invention is to provide a switch wherein continuous energization of the lights is obtained during shifting of the switch mechanism from one driving position to another, thus eliminating "blind" spots produced during shifting of the present type of switches. This insures that at no time will the driver of the vehicle be without proper illumination during shifting movement of the switch.

A further object of the present invention is to provide a switch which is resiliently locked in each of its operating positions, and is held in these positions by spring tension means resisting movement of the switch mechanism except upon manual actuation by the driver of the vehicle. In this connection, another desirable feature provided by the tension means is the positive engagement of the mechanism whereby the switch cannot be left in a position intermediate any two of its operating positions.

One of the primary features of the present invention is the disposition of all of the operating parts of the switch within a single cylindrical housing, which housing has its end sealed by an insulating member carrying the terminal members for connecting the switch contacts to the desired electrical circuits.

Another feature of the invention is the provision of a small, compact switch having relatively few operating parts and in which continuous smooth wiping contact is effected between an operating cam and the contact-engaging switch plungers which serve to engage the resilient contact fingers of the terminal members.

Other objects and advantages of the present invention will appear more fully from the following detailed description, which, taken in connection with the accompanying drawings, will disclose to those skilled in the art the particular construction and operation of a preferred embodiment of my switch.

In the drawings:

Figure 7 is a diagrammatic view illustrating the manner in which the cam controls the movement of the switch plungers;

Figure 8 is a bottom plan view of the terminal member, showing the resilient contact portions secured to each of the terminal members;

Figure 9 is a sectional elevational view of the switch of Figure 1 embodied in a different type of housing; and Figure 10 is a diagrammatic view illustrating the different operating circuits provided upon movement of the switch into its different operating positions.

Figure 1:
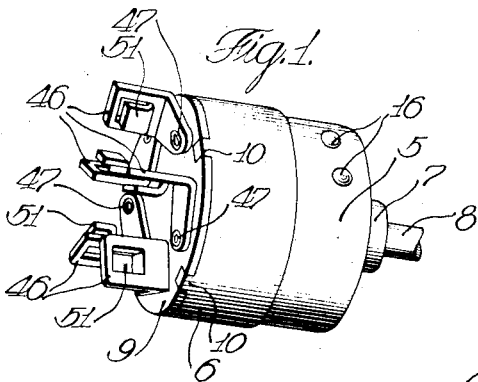
Figure 1 is a perspective view of the assembled switch housing, showing the terminal member in position sealing the open end of the housing.

Referring now in detail to the drawings, in Figure 1 I have disclosed the substantially cylindrical switch housing indicated at 5, which housing is provided with an annular enlarged portion 6, and which is also provided with an extended bushing 7 into which the operating rod 8 of the switch operating mechanism is adapted to extend.

Sealing the open end of the annular enlarged portion 6 of the housing 5 is an insulating member 9, which is provided with cutout portions receiving the extending ears 10 formed integral with the housing 6 and which are bent over to engage the exterior surface of the member 9 in order to secure the same in position upon the housing 5. A plurality of ears 10 are spaced about the periphery of the housing, in order to secure the member 9 firmly to the housing.

Figure 2:
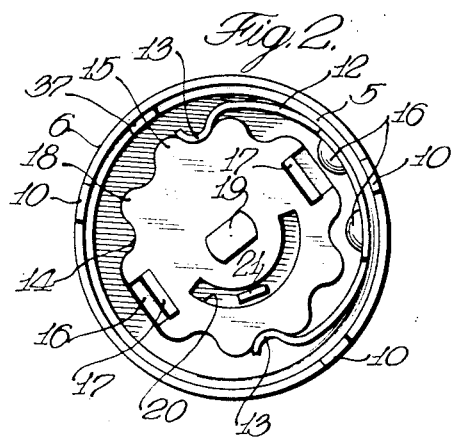
Figure 2 is a plan view of the interior of the housing with the operating cam and the contact member removed.

Considering now Figure 2, which is an interior view of the housing 5, it will be noted that the housing is provided, adjacent its lower end, with a spring member 12, which terminates at its ends in looped portions 13, which are adapted to engage in serrations 14, formed in the actuating member 15. The spring member 12 is secured to the housing by a pair of spaced rivet members 16, which rigidly fix the spring in position and provide free movement of the extending ends.

The operating member 15 is composed of a pair of superposed planar members 15 and 16, the upper member having a pair of normally extending tongues 17 projecting from opposite sides thereof. The operating rod 8 is provided with an extending slabbed off portion, indicated at 19, which projects through corresponding openings in the members 15 and 16, and has its inner end riveted over to rigidly engage the members 15 and 16 for rotation therewith.

Each of the members 15 and 16 is provided with an arcuate cutout portion 20, which is adapted to receive an upstanding lug 21 projecting from the housing 5, this lug engaging in the arcuate cutout portion 20 to limit the rotation of the members 15 and 16. Each of the members 15 and 16 is also provided about its periphery, with a plurality of serrations or rounded gear members having the grooves 14 and the extending tooth portions 18. The notched ends 13 of the spring members are adapted to progressively engage in each of the serrations 14, thus positively forcing the operating members 15 and 16 into the proper operating positions as the shaft 8 is rotated.

In this manner, the members 15 and 16 are positively moved to each operating position, and cannot be set at any point intermediate any two of the operating positions. Further, the resiliency of the spring 12 serves to lock the members in operating position, and they can only be disengaged by manual operation of the driver of the vehicle.

Figure 4:
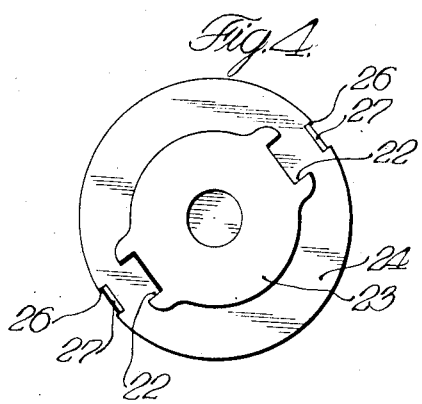
Figure 4 is a bottom plan view of the cam shown in Figure 3.
Figure 3:
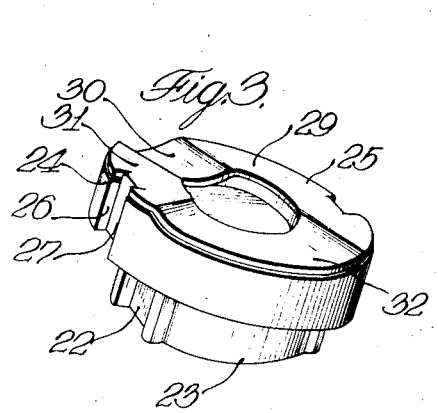
Figure 3 is a perspective view of the operating cam.

The upstanding tongues 17 are adapted to engage in suitable recesses 22 formed in the annular base 23 of a cam operating member indicated generally at 24 in Figures 3 and 4, and serve to rotate the cam member upon rotation of the shaft 8. The cam member is preferably formed of a molded condensation product, and is provided on its upper surface with a metallic collector ring 25 which is shaped to correspond to the upper surface of the cam member 24.

The upper portion of the cam 24 is also provided with a pair of recesses 26, which are adapted to receive the downwardly extending tongues 27 of the collector ring 25, and serve to lock the ring 25 in nonrotative position with respect to the cam 24.

Considering in detail the cam surface, this surface comprises a substantially raised flattened portion 29, a depressed portion 30 which is smoothly connected to the raised portion 29, a second sector-shaped portion 31, and a substantially sector-like depressed portion 32. The portions of the collector ring surface between the raised portions 29 and 31, and the depressed portions 30 and 32 are preferably in the form of smooth curves, to provide for smooth sliding engagement of the collector ring assembly as it is rotated by means of the shaft 8.

The cam member 24 is disposed in the housing 5 over the operating members 15 and 16, and is engaged for rotation by the lugs 17. The depth of the housing is sufficient to accommodate the operating members and the cam in the reduced portion thereof, and disposed immediately above the cam member is an insulating block member 35, which is provided with a keyway 36 adapted to engage about the key 37 formed on the interior surface of the housing 5, as shown in Figure 2. This keyway in the housing may be formed either integrally with or as a separate member secured to the housing. This positively locks the block member 35 against rotation within the housing, and disposes the member in fixed predetermined position within the housing. The member 35 is adapted to carry a plurality of contact-engaging plungers indicated at 38, the plungers being provided with substantially semi-spherical headed portions 39 projecting from the lower face of the block member 35. The headed portions 39 are adapted to have sliding engagement within recesses 40 formed within the housing or block member 35, and preferably are spring-pressed out of position by the coiled spring members 41, which are biased at one end against the inner surface of the head portions 39 of the plungers, and at the other end against the base of the recess 40. The plunger portion 38 of the contact member extends through a suitable aligned opening in the housing, and normally projects only a slight distance thereabout. However, when the collector ring 25 is rotated into a position to bring either the portion 29 or the portion 31 in registry with the headed end 39 of a particular plunger, the plunger is raised against the pressure of the spring 41, and the head portion of the plunger is forced into an annular space provided between the peripheral wall 6 of the housing and an inner raised boss portion 42 formed integral with the member 35.

When in raised position, the inner end of the plunger 38 is adapted to contact the resilient spring contact fingers 45 of a particular terminal member 46, as shown in Figures 1 and 8. Referring now in detail to Figure 8, the contact fingers 45 are provided with the contact portions raised above the surface of the member 9, and which are secured in position by means of rivets 47 extending through the member 9, the rivets 47 being headed over on the external side of the member 9 to rigidly secure the contact fingers 45 in position. Each of the contact fingers 45 is provided with an integrally formed downwardly turned lug portion, indicated at 48, which is adapted to bite into the surface of the member 9, to secure the fingers 45 against rotation with respect to the rivets 47. The member 9 has a plurality of recesses 50 formed in the periphery thereof for receiving the lugs 10 carried by the housing 5 to secure the member 9 in position over the open end of the housing. The lug or terminal members 46 may be of the solder type, having the integrally offset portions 51 between which the conductors are soldered, or may be of the threaded type, with screws for securing the conductor in position. These lug members are all confined within the external periphery of the housing 6, and it is therefore apparent that the diameter of the housing 6 defines the internal diameter of the bushing into which the switch may be fitted.

Considering now the operation of the switch, it will be apparent that by rotation of the shaft 8, the operating members 15 and 16 are rotated within a range limited by the length of the groove 20, and in turn, because of the engagement of the lugs 17 in the recesses 22, rotate the cam member 24. Rotation of the cam member about the undersurface of the housing 35 results in selective raising and lowering of the plunger members 38, as determined by the surface of the cam member and by the collector ring 25. This alternate raising and lowering of the plungers 38 results in electrical contacts being set up through the plungers and the continuous collector ring 25 and the particular terminals 46, the plungers contacting the spring fingers 45 which are electrically and mechanically connected to the terminal members 46. From the terminal members 46, suitable conductors are lead out to the various lighting circuits.

With reference to Figure 10, the particular circuit connections are disclosed therein, and comprise a connection from each of the terminal members 46 to a corresponding filament in the light circuit. For example, the terminal member indicated by the reference numeral 56 is connected through conductor 61 to the filament of the tail light 62. The next terminal member 46, indicated at 57, is connected through conductor 63 to the filaments of a pair of parking lights 64. The terminal 58, which corresponds to the next terminal 46, is connected through conductor 65 to the bright filaments 66 of the head lamp. The next or fourth terminal 59 is connected through conductor 67 to the dim filaments 68 of the head lamp, while the remaining or fifth terminal 60 is connected to a suitable source of electrical supply, such as the battery 69. The returns of the filaments of all of the lights are grounded to the frame of the vehicle, to form a common return to the battery 69.

In considering the operation of the circuit, I have exemplified this by a plurality of rings 70, 71, 72, and 73. Spaced about each of the rings 70 to 73, inclusive, are block members, which correspond to an engaged position of one of the plungers 38, or, in other words, correspond to a position when a plunger 38 is raised by contact of the headed portion 39 thereof upon either the surface 29 or the surface 31 of the collector ring 25. Thus, in the outer ring 70, which corresponds to "parking" position of the switch, the contacts 56, 57 and 60 are raised, which corresponds to a position of the cam whereby three of the plungers 38 are raised so that their inner ends contact the spring fingers 45 of the terminals 46. In this position, current enters the collector ring through the terminal 60 and the contact block 75. The current travels about the collector ring to the contact block 76, which is connected, through terminal 56, to the filament of the tail light 62, thus energizing the tail light. Current also travels to the contact block 77, which is connected to terminal 57 to the filaments of the parking lamp 64, thus energizing both the tail light and the parking lights. This constitutes the parking position of the switch.

As the operating rod 8 is rotated to the next corresponding position, which position is determined and fixed by the engagement of the looped ends 13 of the spring 12 in the serrations 14 carried by the operating members 15 and 16, the contact members are changed in position, the contact 75 dropping into the depression 30 in the selector ring, while the contacts 76 and 77 remain in raised position upon the surface 29. Also, contact 78 is raised, by engagement with the raised portion 31 of the collector ring 25, but since contact 75 is not in raised position, there is no connection to the battery 69, and therefore no lights are illuminated.

As the switch is rotated to its next position, which corresponds to the "dim" position, the contact 78 remains in raised position. Contact 77 drops into the depression 32, contact 76 remains in raised position upon the surface 29, and contact 75 is again placed in raised position by engagement upon the surface 29. This provides a circuit disclosed by the ring 72, in which current passes from the battery through terminal 60 and contact 75 to the ring, and from the ring through contact 76 and terminal 56 to tail light 62, also through contact 78 and terminal 59 to the dim filaments 68 of the head lamp. This provides for energization of the tail light and the dim filaments of the head lamps, or, in other words, the dim position of the switch.

As the switch is again rotated to its fourth and final position, corresponding to the "bright" position of the switch, the contact 75 remains upon the spring finger 45, since it is still engaged by the raised portion 29 of the collector ring 25, and the contact 76 also remains in raised position for the same reason. In addition, the contact 79 is engaged by the raised portion 31 of the cam, while contact member 78 drops into the depression 30 of the collector ring, and becomes disconnected from terminal 59. In this position, as exemplified by ring 73, the current passes from the battery 69 through terminal 60 and contact 75 to the ring 73, and from the ring 73 through contact 76 to the tail light 62, and through contact 79 and terminal 58 to the bright filaments 66 of the head lamps. The terminal 59 and the terminal 57 are disconnected, because the contacts 77 and 78 are in the depressions 32 and 30, and therefore do not make contact with the terminals. The "bright" position of the switch is diagrammatically exemplified in Figure 7, in which the full line indications of the headed portion 39 of the terminals indicate that those contacts which are raised are in position to provide connection to the respective terminals. In this position, contacts 75 and 76 are indicated as engaging the raised portion 29 of the collector ring, contact 76 being placed at the lower portion of the figure. Contact 78 has been dropped into the depression 30, and is indicated in dotted lines to illustrate that it is no longer energized. Contact 79 is raised by the raised surface 31 of the collector ring, and engages the terminal 58 for connection to the bright filaments of the head lamp. Contact 77 is riding in the depression 32, and does not make contact with terminal 57, and thus only the tail light and the bright filaments of the head lamp are energized.

By spacing the raised and depressed portions of the collector ring properly, as illustrated in Figures 3 and 7, the contacts are at all times in such position that upon movement of the switch, there is no "blind" spot while the switch is changed from one position to another, since the contact being deenergized remains in raised position until the contact being energized starts to raise, at which point the deenergized contact drops into the depression, simultaneously with the engagement of the other contact, thus insuring that proper illumination will be had at all times. Also, the provision of a continuous selector ring with smoothly curved surfaces provides for a continuous smooth wiping contact between the headed portions 39 of the plunger 38 and the selector ring, and thus reduces wear and provides for smooth operation of the switch.

If desired the switch of the present invention may be embodied in a housing similar to the housing described in detail in the patent issued to Harold Catron, No. 1,960,771, of May 29, 1934, wherein the switch housing is bolted to the lower end of the steering column. Such a housing is illustrated in section in Figure 9, and will be briefly described herein. The housing comprises a base portion 80, which is adapted to have the enlarged annular portion 81, corresponding to the enlarged portion 6 of the housing 5. Fitting into the upper end of the enlarged portion 81 of the housing is a second housing member 82 having an opening 83 therein adapted to receive the conductors which are connected to the terminals 84 disposed within the housing. The housing 82 is secured within the housing 81 by means of a bail 85, which engages in a notch formed in the surface of the housing 82, and which is carried by suitable ears (not shown) formed integral with the plate member 86. Bayonet slots may also be provided to secure engagement between the two housings.

The plate member 86 is provided with the upstanding flanged ear members 87, having openings 88 therein for receiving suitable securing means to fix the housing in position with respect to the steering column of the vehicle. The plate 86 is secured to the base of the housing 80 in any desired manner, such as by riveting, welding, or the like. Projecting through the housing 80 and the plate member 86 is a bushing indicated generally at 90, which has a keyway 91 formed integrally therewith and adapted to receive an operating rod for rotating the bushing. A suitable annular washer 92 is carried by the extending end of the bushing 90, and serves to space the bushing within the opening 93 formed in the plate member 86. At its inner end, the bushing is provided with an annular collar 94 upon which is adapted to seat a pair of operating members 95 and 96, the member 96 being provided with forwardly extending ear portions 97 which are adapted to seat in corresponding recesses 22 formed in the cam member 24. This cam member may be the same as the cam 24 described in detail in Figures 3 and 4.

Figure 5:
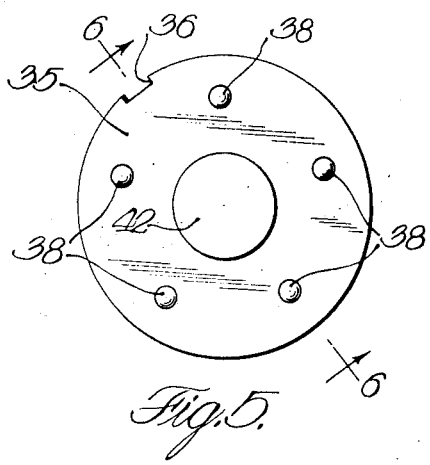
Figure 5 is a top plan view of the housing carrying the contact-engaging switch plungers.
Figure 6:
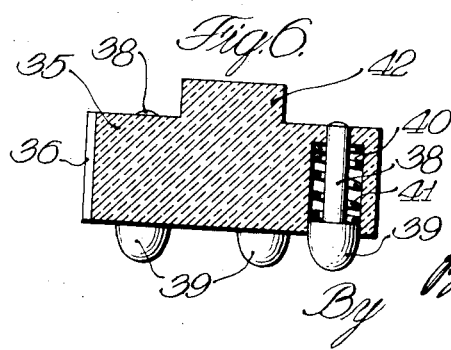
Figure 6 is a sectional view taken substantially on line 6—6 of Figure 5.

The members 95 and 96 are provided with peripheral serrations, corresponding to the serrations 14, and a spring member 12 is adapted to have its extending ends engaging in the serrations for constraining the rotation of the members 95 and 96. Suitable keying means may be provided for securing positive locked rotation between the bushing 90 and the members 95 and 96, so that upon rotation of the bushing the cam 24 will be rotated as described in connection with Figures 3, 4, and 7. The remainder of the details of construction of this embodiment of the switch are the same as described in connection with Figures 5, 6, and 7, and need not be described in detail herein.

Suffice it to say that the terminal members 84 are provided, in this embodiment, with bolts 98 for securing the conductors thereto. The circuit connections for this embodiment of the switch are the same as described in connection with Figure 10.

It will therefore be apparent that I have provided a switch structure which is simple in design, has relatively few moving parts, and is compactly arranged in order to have a small external diameter, so that it may be carried within a suitable bushing disposed in the steering column. Also, I have provided a switch which is resiliently locked in each of its operating positions, and which cannot be set in any position intermediate its operating positions. Further, the continuous camming surface provides for smooth wiping contact, while the spring pressed plungers insure that energization of the various circuits will occur only upon contact by the raised portions of the collector ring 25.

I do not intend to be limited to the exact structural details shown and described, inasmuch as changes in the circuit and also in the particular construction of the various units of the switch may be made without departing from the spirit and scope of the present invention. It is to be understood that I limit my invention only as defined by the appended claims.

I claim:

1. In a switch of the class described having a plurality of successive circuit-engaging positions, a cam member having a metallic surface having elevated spaced contact portions adapted to effect continuous energization of a previously selected circuit until said switch is moved into another circuit-engaging position.

2. A switch comprising a switch housing, a rotatable shaft extending into one end of said housing, operating means within said housing including a collector ring having a cam surface, a plurality of contact plungers, and switch terminal means sealing one end of said housing and adapted to be selectively contacted by said plungers upon rotation of said shaft.

3. The combination with a switch housing having contact means therein, of means for effecting selective engagement of said contact means comprising a rotatable plate member having a serrated periphery, and spring means fixed in said housing and having extending arm portions engaging in diametrically opposed portions of the periphery of said plate member for restraining rotation thereof.

4. The combination with a cup-shaped switch housing having circuit opening and closing means therein, of a continuous cam collector ring disposed in said housing, means for rotating said ring including a plate member disposed in the base of said housing and carrying said collector ring, and spring pressed contact plungers adapted to be selectively forced into contact engaging position upon rotation of said ring.

5. In a switch of the class described, a switch housing of cylindrical form having a plurality of spaced contact-engaging plungers therein, spring means normally holding said plungers in disengaged position, and an insulated collector ring disposed in said housing and having a cam surface continuously engaging all of said plungers and rotatable to move said plungers selectively into contact-engaging position.

6. In a switch of the class described, a cup-shaped housing, a shaft extending axially into said housing, a pair of plate members secured to the end of said shaft within said housing and having serrated peripheries, spring means carried by said housing and engaging in the serrations of said plate to lock said plates resiliently in successive operating positions, stop means for limiting rotation of said plates, a cam member carried by and rotatable with said plates, a collector ring disposed over the surface of said cam member and fixed thereto, a block member keyed in said housing above said collector ring and having spaced contact-engaging plungers continuously engaged by said collector ring, and an insulated plate having terminal members adapted to be selectively contacted by said plungers upon rotation of said shaft.

7. A switch adapted to be fitted within a tubular bushing comprising a cup-shaped switch housing, an operating shaft extending into the base of said housing, spring engaged operating means secured to said shaft and tensioned against accidental displacement, a cam member and collector ring disposed within and insulated from said housing adapted to be rotated by said operating means, spring pressed contact-engaging plungers carried in said housing and continuously engaged by said collector ring, and an insulated plate sealing the open end of said housing and carrying terminal contacts connected to a plurality of electrical circuits and selectively engaged by said plungers upon rotation of said cam member, all of said switch parts being disposed within the peripheral extent of said housing.

8. A switch of the class described comprising a switch housing, a terminal plate closing an end of said housing, contact members carried on said plate, an insulating member keyed in said housing and carrying a plurality of spaced contact-engaging plungers normally spring-pressed out of position, and a cam member rotatable in said housing and carrying a continuous metallic collector ring on its cam surface adapted to engage said plungers at all times, rotation of said cam causing selective engagement of said contacts and plungers.

9. An operating cam for selectively actuating a plurality of circumferentially spaced contact plungers comprising a rotatable member having its upper surface provided with a succession of unequal elevations and depressions, and a metallic annular ring disposed over said surface and shaped thereto, said ring having continuous smooth wiping contact with said plungers for raising and lowering said plungers upon rotation of said cam.

10. An operating cam for a switch of the class described having a substantially annular camming surface comprising two elevated planar portions of unequal extent spaced apart by depressed portions of unequal extent, said portions being joined by smooth curved portions, and having a portion of reduced diameter provided with opposed recessed portions for receiving rotatable cam actuating means.

11. In a switch of the class described, operating mechanism comprising a pair of plate members having identical serrated peripheries, said members being carried by a rotatable shaft in superposed position thereon, spring means fixed in position and having flexible portions engaging in said serrated peripheries for determining movement of said plate members, and lugs formed on one of said members and extending normally therefrom.

12. In a switch of the class described, operating mechanism comprising a pair of plate members having identical serrated peripheries, said members being carried by a rotatable shaft in superposed position thereon, spring means fixed in position and having flexible portions engaging in said serrated peripheries for determining movement of said plate members, and lugs formed on one of said members and extending normally therefrom, said members having means formed therein for determining the extent of rotation of said members.

13. In combination, a switch housing, a rotatable shaft extending into said housing, an actuating member carried by said shaft, an insulating member having integrally formed recesses engaged by said actuating member, a collector ring mounted in abutting engagement with said insulating member and having integrally formed locking means engaging therewith, and spring-pressed contact plungers adapted to be urged into contact engaging position upon rotation of said collector ring.

14. A collector ring assembly for a switch of the class described comprising an insulating member having a face portion forming a cam surface, locking means formed in the periphery of said member, and a metallic collector ring conforming to the contour of said cam surface and having integral means engaging in said locking means.

15. A collector ring assembly for a switch of the class described comprising an insulating member having a face portion forming a smoothly curved cam surface having planar raised portions of unequal extent, and a collector ring secured to said member and conforming to the contour of said cam surface.

16. The combination with a switch having a collector ring assembly adapted to press selected contact plungers into contact engaging position upon rotation of said ring, of snap actuating means therefor comprising a rotatable actuator having means for securing said assembly in fixed position thereon, said actuator having a serrated periphery, and spring means having end portions engaging said serrated periphery at opposite sides thereof.

17. Actuating means in a switch of the class described having a serrated periphery, opposed lug portions extending normal to the plane of said actuator for engaging a contact operating member, and spring means having rounded end portions engaging opposed serrations in the periphery of said member for preventing positioning of said actuator intermediate any two contact engaging positions of said contact operating member.

18. In combination, in a switch of the class described, a rotatable insulating member having a face portion forming a cam surface, a continuous collector ring mounted on said member and conforming to said cam surface, a block member having spring-pressed contact plungers extending therethrough, and contact terminals adapted to be engaged by said plungers upon rotation of said insulating member.

19. In combination, a cup-shaped switch housing having a rotatable insulating cam member therein, a metallic collector ring conforming to the contour of the cam portion of said member and secured thereto, a block member disposed in non-rotative position in said housing, spring-pressed plungers carried by and extending through said block member, a terminal member formed of insulating material closing the end of said switch housing and having inwardly extending contact portions adapted to be engaged by said plungers upon rotation of said cam member, and a conductor housing enclosing said terminal member and having telescoping engagement with said switch housing.

20. In a switch of the class described, a cup-shaped switch housing, a rotatable shaft extending into said housing, actuating means carried at the inner end of said shaft comprising a pair of planar members, one of said members having normally extending tongue portions, contact actuating means carried by said tongue portions, arcuate aligned slots formed in each of said members, and an integral tongue struck up from the base of said switch housing and extending into said slots for limiting the rotation of said shaft.

21. An operating member for a switch of the class described comprising an insulating member having a cylindrical portion provided with a plurality of pairs of outwardly extending rib portions defining opposed recesses, an enlarged cylindrical portion formed integrally therewith, a pair of notches formed in the periphery of said enlarged portion, and a continuous collector ring disposed over the face of said enlarged portion and having integral locking means engaging in said notches.

22. A block member for a switch of the class described adapted to be interposed between the operating member and the terminal carrying member thereof, said block member having a plurality of recesses formed in one face thereof and having aligned openings extending through said member to the opposite face thereof, headed contact plungers disposed in said recesses and reciprocable therein, spring means in said recesses normally urging said plungers outwardly from one face portion of said block member, and a central projecting boss formed on said member and engaging said terminal carrying member for spacing said members apart.

23. In combination, in a switch of the class described, a collector ring having a predetermined contoured surface, a block member having contact plungers therein adapted to be selectively depressed upon rotation of said collector ring, and a terminal member having contact means engaged by said plungers upon depression thereof by said collector ring.

24. An operating cam member for a switch of the class described having a substantially annular camming surface comprising a plurality of elevated planar portions of unequal extent spaced apart by depressed portions, and a metallic collector ring conforming to the contour of said camming surface and secured thereto.

25. An operating cam member for a switch of the class described having a substantially annular camming surface comprising a plurality of elevated planar portions of unequal extent spaced apart by depressed portions, notches formed in the periphery of said member, a metallic collector ring conforming to the contour of said camming surface, and integral means formed on said ring engaging in said notches.

26. In a switch, the combination of a plurality of contact terminals, spring contacts carried thereby, rotatable operating means including a cam surface, and a plurality of reciprocable contact plungers disposed between said operating means and said spring contacts and normally urged out of engagement with said spring contacts, said surface comprising a metallic band member for continuously electrically bridging between all of said contact plungers.

27. Operating means for a switch of the class described comprising an insulating cam member having a smooth camming surface comprising a plurality of elevated planar contact portions spaced apart by depressed portions of unequal extent, and an annular contact ring having a corresponding surface and having means for non-rotatively securing the same to said cam surface.

28. Operating means for a switch of the class described comprising an insulating cam member having a continuous smooth camming surface, comprising a plurality of elevated planar portions of unequal extent spaced apart by depressed portions, an annular contact ring having a corresponding surface, and means for non-rotatively securing said ring over the smooth cam surface of said cam member.

29. In a switch, the combination of three axially aligned insulating members, a collector ring having a camming surface carried by one of said members, a plurality of contacts carried by another of said members, a corresponding plurality of reciprocable contact-engaging plungers carried by the third member, and actuating means for rotating said collector ring carrying member to force preselected ones of said plungers into engagement with said contacts.

30. A switch of the class described, including a switch housing having a closed end, a bushing rotatable in said end, a pair of flat members secured to said bushing and rotatable therewith, one of said members having a pair of upstanding ears, the peripheries of said members between said ears being serrated, a spring member secured in said housing and having ends forced into engagement in the serrated peripheries of said members to hold said members in selected positions, said spring member forcing said flat members into a selected position from any intermediate position.

31. Operating means for a switch of the class described comprising an insulating cam member having a smooth camming surface consisting of raised and depressed portions of unequal length, an annular metallic contact ring having a corresponding surface, means for securing said contact ring in non-rotative position over said camming surface, and means formed integral with said cam member and spaced from the camming surface thereof for receiving rotatable actuating arms.

RALPH L. DASHNER.